(12) United States Patent
Boonekamp et al.

(10) Patent No.: US 8,876,339 B2
(45) Date of Patent: Nov. 4, 2014

(54) LUMINAIRE

(75) Inventors: Erik Paul Boonekamp, Utrecht (NL);
Antonius Petrus Marinus Dingemans, Tilburg (NL); Michel Cornelis Josephus Marie Vissenberg, Roermond (NL)

(73) Assignee: Koninklijke Philips N.V., Eindhoven (NL)

( * ) Notice: Subject to any disclaimer, the term of this patent is extended or adjusted under 35 U.S.C. 154(b) by 159 days.

(21) Appl. No.: 13/697,630

(22) PCT Filed: May 26, 2011

(86) PCT No.: PCT/IB2011/052297
§ 371 (c)(1),
(2), (4) Date: Nov. 13, 2012

(87) PCT Pub. No.: WO2011/151762
PCT Pub. Date: Dec. 8, 2011

(65) Prior Publication Data
US 2013/0063925 A1    Mar. 14, 2013

(30) Foreign Application Priority Data

May 31, 2010   (EP) .................................... 10164485

(51) Int. Cl.
F21V 11/00 (2006.01)
G02B 5/04 (2006.01)
G02B 5/02 (2006.01)
F21S 8/00 (2006.01)
F21V 5/02 (2006.01)
F21Y 101/02 (2006.01)

(52) U.S. Cl.
CPC . *F21V 5/02* (2013.01); *G02B 5/045* (2013.01); *G02B 5/0215* (2013.01); *F21Y 2101/02* (2013.01); *G02B 5/0278* (2013.01); *F21S 8/00* (2013.01)
USPC ............................ 362/355; 362/235; 362/277

(58) Field of Classification Search
USPC ......... 362/512, 235, 277, 282, 317, 319, 322, 362/355, 361
See application file for complete search history.

(56) References Cited

U.S. PATENT DOCUMENTS

| | | | |
|---|---|---|---|
| 2,887,568 A | 5/1959 | Franck | |
| 4,969,075 A | 11/1990 | Helm et al. | |
| 5,309,544 A | 5/1994 | Saxe | |
| 6,330,386 B1 | 12/2001 | Wagner et al. | |
| 6,749,313 B2 | 6/2004 | Ludwig et al. | |
| 2009/0168395 A1 | 7/2009 | Mrakovich et al. | |
| 2009/0323334 A1 | 12/2009 | Roberts et al. | |

FOREIGN PATENT DOCUMENTS

| | | |
|---|---|---|
| BE | 558712 | 4/1960 |
| EP | 1055870 A1 | 11/2000 |
| JP | 2008251451 A | 10/2008 |
| WO | 2008146229 A2 | 12/2008 |

*Primary Examiner* — Vip Patel
(74) *Attorney, Agent, or Firm* — Meenakshy Chakravorty (57) ABSTRACT

The invention relates to a luminaire (1) comprising a housing (2) having at least one side wall part (3) and a bottom wall part (5), a light source (7) being positioned in the housing (2), and a curved, optically transparent sheet (10) having a plurality of elongated linear prism structures with right top angles (16) on its concave surface. Said surface faces away from the light source (7). The invented luminaires (1) show reduced glare. They can be used with great advantage in office lighting and house lighting.

10 Claims, 5 Drawing Sheets

LUMINAIRE

FIELD OF THE INVENTION

The invention relates to a luminaire comprising a housing, a light source and an optically transparent sheet having a plurality of elongated linear prism structures with right top angles.

BACKGROUND OF THE INVENTION

Such a luminaire is known per se, for example from the published patent application WO 2008/146229, filed in the name of Applicant. The luminaires described in said patent application comprise a plurality of illumination systems, each having a housing, a light source, an exit window and reflecting means. In the embodiment shown in FIG. 3-C, a collimating plate is provided on a wall of the housing. This plate consists of an optically transparent sheet having a plurality of elongated linear prism structures with right top angles. This sheet is intended to redirect light beams impinging at grazing angles towards an angle closer to the normal to the sheet. In the known luminaire, especially light emitting diodes (LEDs) are used as a light source. During operation of the luminaire, such LEDs emit Lambertian light in the direction of the collimating plate, aiming to transform the LED luminance from a very high and discrete degree to a uniform degree of brightness which is acceptable to an observer.

Although said luminaire presents a clear improvement as compared with the known prior art luminaires, the described luminaire still has as a drawback that it does not fully comply with current strict glare requirements. Glare is caused by excessive contrast between bright and dark areas in the field of view of an observer. Illumination systems and luminaires comprising LEDs are known to cause glare problems. Especially in the design of illumination systems and luminaires intended for application in the area of in-house lighting and office lighting, the issue of glare reduction receives much attention. Moreover, these luminaires are rather expensive and do not provide much flexibility in beam shaping.

OBJECT AND SUMMARY OF THE INVENTION

It is an object of the present invention to provide a luminaire in which the mentioned and/or other drawbacks are obviated or at least mitigated.

According to a first aspect of the present invention, this object is achieved by means of a luminaire comprising:

a housing (2), having at least one side wall part (3) and a bottom wall part (5), a light source (7) being positioned in the housing (2), and a curved, optically transparent sheet (10) having a plurality of elongated linear prism structures with right top angles (16) on its concave surface, said surface facing away from the light source (7), wherein the curved sheet (10) is clamped in sheet clamps in a self-bearing manner in the luminaire (1), the mutual distance between the sheet clamps being changeable for enabling adjustment of the curved sheet.

The invention is based on the insight that the application of an optically transparent sheet having the indicated characteristics can substantially reduce the remaining glare in luminaires. Moreover, it appears that such sheets can also be used for beam shaping. Sheets of this type are offered in huge volumes to the LCD industry by the firms 3M and Reflexite. These sheets are used in LCDs to improve the brightness considerably when viewing takes place perpendicularly to the LCD screen. On one of their main surfaces these sheets have a plurality of elongated linear prism structures having a top angle of appr. 90° (=right top angle). The best results are achieved using sheets with top angles of exactly 90° (deviation less than 5°). The other main surface is flat (i.e. not structured). Such sheets are optically transparent (i.e. non-absorbing) in the visible part of the electromagnetic spectrum, i.e. in the range between 380 nm and 780 nm. It is noted that the word 'sheet' in this application invariably refers to an optically transparent sheet having a plurality of elongated linear prism structures with right top angles.

The luminaire initially need not be provided with a light source, but could be provided with lamp accommodating means in which at a later stage the light source is to be mounted. Said lamp accommodating means are located at practically the same location of the light sources as indicated/shown in the drawing.

An essential aspect of the present invention is that the sheet in the luminaire should be curved. As will be elucidated in the experimental part, the application of flat sheets does not lead to a sufficient reduction of the remaining glare generated during operation of the luminaire. It is self-explaining that the (imaginary) axis of curvature runs parallel to the elongated linear prism structures of the sheet. Said structures should moreover be on the concave (hollow) surface and should face away from the light source. Using this configuration of light source and sheet in a luminaire enables glare reduction and beam shaping. The invented luminaire can be used with great advantage if glare reduction and beam shaping should be optimized. It is noted that the (symmetric) form of the curved sheet can be adapted and thus glare reduction can be obtained and the shape of the light beam generated by the luminaire can be varied.

In a preferred embodiment of the luminaire according to the invention, the curvature of the sheet (as defined in the next paragraph) is between 0.02 and 0.4. In the case of sheets with a curvature lower than 0.02, the amount of glare reduction in the luminaire is insufficient. In the case of a curvature higher than 0.4, too much intrinsic tension is built up in the sheet, causing risks of physical damage to the sheet. In the range of 0.1 to 0.3, optimal values for the curvature are found, in that a good compromise between glare reduction and internal sheet stress is reached. The optimal value of curvature in a sheet is approximately 0.2.

In the present application, curvature of a sheet is defined as the ratio between a) the maximum distance (unity) of the curved sheet to an imaginary flat plane connecting two opposing ends of the sheet and b) the distance (unity) between these ends. Thus, the curvature of a square sheet of 10 cm×10 cm having a maximum distance of 2 cm from the flat plane connecting two opposing ends of the sheet, amounts to 0.2. Considering the mirror plane of both opposing ends of the sheet, the curve may be symmetric or asymmetric. Although asymmetric curvature in the sheet will also show the advantageous effect of glare reduction, such curvatures will negatively influence the beam shape of the light exiting the luminaire. So, sheets having the curve maximum centrally between two opposing edges are preferred. The (symmetric) curves can have different forms, like a parabolic curve or a Gaussian curve.

Another embodiment of the luminaire according to the present invention has the feature that the sheet is clamped in a self-bearing manner in the luminaire. In the case that the distance between the sheet clamps used can be changed, the curvature of the sheet can be adjusted within certain limits. If the clamping direction can also be adjusted, additional freedom is provided for adjusting the curved form of the sheet, f.i.

from a parabolic form to a Gaussian form. This embodiment of the invented luminaire can be used with great advantage if glare reduction and beam shaping should be optimally compromised. It is noted that the maximum out-of-plane distance and the (symmetric) form of the curves can be adapted independently. These two parameters have different effect on the glare reduction and the shape of the light beam generated by the luminaire. So, both glare reduction and beam shaping can be adjusted independently to a certain degree.

A further embodiment of the invented luminaire has as a feature that part of the sheet is provided on the surface of at least one cylinder segment. Said cylinder segment may be part of the housing of the luminaire. This configuration improves the stiffness of the curved sheet, allowing the use of luminaires with this feature in circumstances where servicing of the luminaires is costly and difficult. In a cross section normal to the axis of the cylinder, the sheet shows an almost perfect circle-form. The part of the sheet where the light beams are transmitted during operation of the luminaire should be free from the cylinder segment. The sheet can be attached in different ways, like by gluing or clamping, the former being preferred. The inverse radius of such curved sheets having a circular cross section preferably ranges between 0.05 $cm^{-1}$ and 0.15 $cm^{-1}$, and more preferably between 0.08 $cm^{-1}$ and 0.12 $cm^{-1}$. In these ranges optimal compromises between glare reduction and physical stress in the circularly curved sheet can be achieved.

The presented invention employs in principle various types of light sources, like low-pressure discharge lamps, high-pressure discharge lamps, incandescent lamps of laser light sources. Satisfactory results have been achieved with a one-dimensional light source. Such a light source can be formed by a fluorescent tube or by a plurality of LEDs positioned in a straight line (line lighting). However, most preferred is the embodiment of the invented luminaire which has the characteristic that the light source is a two-dimensional area generating light of a constant flux during operation. Such a light source can be formed by a number of fluorescent tubes positioned adjacent to each other. However, it is preferred to use a two-dimensional array of LEDs. These LEDs can be positioned on the bottom wall part of the housing in order to achieve a two-dimensional area of constant flux. The bottom wall part can be flat but may also be curved. So, the surface of said wall part can have the form of the surface of a cylinder segment or a ball segment. Both single color and multiple color LEDs (especially R, G, B-LEDs) can be applied in this preferred embodiment. To improve the uniformity of the flux per area, a diffuser can be applied in front of the two-dimensional light source. Especially for luminaires comprising this type of extended (two-dimensional) light sources, the application of the described curved sheets leads to a significant reduction of glare.

In a further embodiment of the invented luminaire, the light source comprises a number of blue-emitting LEDs and the housing comprises a layer of phosphor material for converting at least part of the blue light emitted by the light source into light having a different color. The layer of phosphor material can be positioned as a separate layer between the LEDs and the curved sheet. Said layer can be self-bearing or attached to an optically transparent substrate. Preferably the layer is not applied directly on the sheet. By means of this layer of phosphor material, optimization of the color rendering index (CRI) is possible, which is especially beneficial when the luminaire is used for office lighting.

Another embodiment of the invented luminaire is characterized in that the light source comprises a number of LEDs positioned in the housing on at least one of the side wall parts, and that reflecting means are positioned in the housing for directing the light generated by the LEDs via the curved sheet to the exit window. In this embodiment, most of the light emitted by the LEDs impinges indirectly (via the reflecting means) on the curved sheet. This embodiment is especially suited for use in luminaires having a rectangular housing. The LEDs are preferably positioned on one of the two end wall portions (or on both). It is preferred that all inside surfaces of the wall parts of the housing are reflective (specular or prismatic). On at least one of the two side wall portions, but preferably on the bottom wall portion, (diffuse) outcoupling structures are applied, like printed dots.

Interesting is also the embodiment of the luminaire according to the present invention, in which the housing comprises a second light exit window in the bottom wall part. In such a luminaire, the light sources, preferably being LEDs, are positioned on one or more of the side walls. The second exit window need not completely cover the bottom wall portion, but may form part of it. In said embodiment, some LEDs may also be positioned on the (non-transparent) part of the bottom wall portion. The housing may be rectangular, but preferably has a circular form. It is advantageous to position a diffuser plate between the LEDs and the curved sheet. This measure results in better uniformity in the light flux per area of the beam that excites the light exit window.

The second light exit window may be formed by a diffuser plate. Preferred however is the use of an optically transparent sheet (10) having a plurality of elongated linear prism structures with right top angles on one of its surfaces, said surface facing the light source. Said sheet, with prism points directed to the inside of the housing, may be flat or curved. During activation of the LEDs, part of the light emitted by the light sources exits the luminaire via the first exit window, whereas another part exits via the second exit screen. Light exiting the first window can be optimized with the curved sheet regarding glare and beam shape. Light exiting the second window can be optimized regarding beam shape only, as glare is not important here. This embodiment of the luminaire is especially suitable for decorative office lighting purposes.

A still further interesting embodiment of the invented luminaire is characterized in that the exit window comprises a number of sub-windows, being provided with a curved sheet. This embodiment allows the invention to be applied in luminaires with relatively large width (x-direction) and length (y-direction), whereas the depth (z-direction) remains still relatively small. It is preferred to position half of the curved sheets with the axis of curvature in the x-direction and the other half of the curved sheets with the axis of curvature in the y-direction. With this preferred embodiment, glare is almost zero in the direction along the prisms.

BRIEF DESCRIPTION OF THE DRAWINGS

These and other aspects of the invention are apparent from and will be elucidated with reference to the embodiments described hereinafter.

In the drawings.

It is noted that the Figures are schematically and not to scale. References to same parts in different drawings are indicated with the same reference numerals.

DESCRIPTIONS OF EMBODIMENTS

Figure 1:
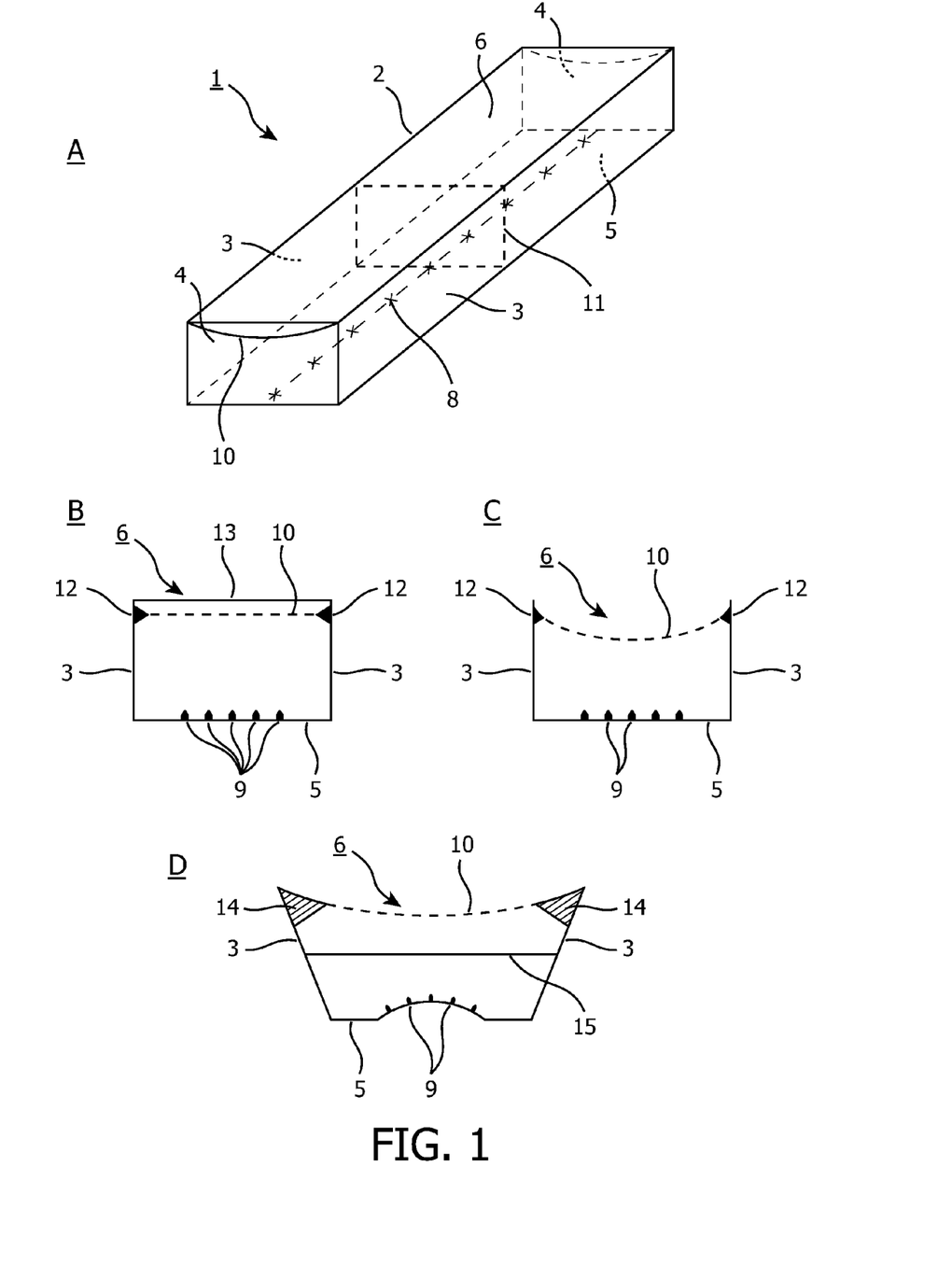
FIG. 1 shows a perspective embodiment of a luminaire and cross sections of three design variations of the perspective embodiment of the luminaire.

FIG. 1-A shows in perspective a luminaire (1) being designed as an elongated box. It comprises a rectangular housing (2) with two side wall parts (3), two end wall parts (4) and a bottom wall part (5). A light exit window (6) is positioned opposite to the bottom wall part (5). It is noted that, in principle, the luminaire can have a circular form, so that only one side wall can be distinguished. Moreover, side walls (3,4) can be formed as curved extensions of bottom part (5), so that no clear distinction can be made between these different wall parts of the housing (2). In the depicted luminaire, the length is 100 cm, the width is 13.5 cm and the height is 5 cm. The inside surfaces of housing parts (3, 4 and 5) are reflective and made of aluminum (Miro of Alanod).

Luminaire (1) comprises a light source (7) (not shown here but indicated by dotted line (8)), positioned on flat bottom wall part (5). Said light source is formed as an array of LEDs (9), being positioned in a two dimensional area and generating a constant flux during operation of the LEDs (9). The luminaire also comprises an optically transparent sheet (10) for transmitting light generated by the light source (7). The sheet has a plurality of elongated linear prism structures with right top angles and is positioned in the housing (2). FIGS. 1-B, 1-C and 1-D are cross sections of the luminaire along the plane indicated by dotted line (11) normal to the length of the luminaire.

FIG. 1-B shows an embodiment of a luminaire not according to the present invention. In this embodiment, sheet (10) is not curved, but flat. Said sheet is attached in the exit window (6) by clamping means (12). The elongated linear prismatic structures run parallel to the length of the luminaire. The surface of the sheet (10) has the prism structures facing away from the inside of the housing, so that the prisms point away from the light source (7). A cover (13) of polycarbonate material is also present in the exit window (6). This cover is optional and protects the interior of the luminaire from dust.

FIG. 1-C shows an embodiment of the luminaire according to the present invention. This embodiment differs from the one shown in FIG. 1-B in that the prismatic sheet (10) is curved. In this luminaire, the curvature of the sheet is 0.2. The linear prisms' structures are on the concave side of the sheet (10). So, also here the prisms point away from the light source (7). In this embodiment the sheet is attached in the exit window (6) by clamping means (12) in a self-bearing manner. The (imaginary) axis of curvature runs parallel to the elongated linear prism structures of the sheet. So, this axis is normal to the plane of the cross section. As will be detailed below, this embodiment of the luminaire shows less glare during its operation, especially when viewing takes places in the length direction of the luminaire.

FIG. 1-D shows a further embodiment of the luminaire according to the invention. In this embodiment, opposed side walls (3) are not parallel, but extend away from each other, when viewed in the direction of the exit window (6). Further, the array of LEDs (9), which are positioned in a two dimensional area and which generate a constant flux during operation of the LEDs (9) are not in a flat bottom wall part (5) plane, but on a curved bottom part (5). Moreover, a number of the LEDs (9) are blue-emitting LEDs.

Figure 3:
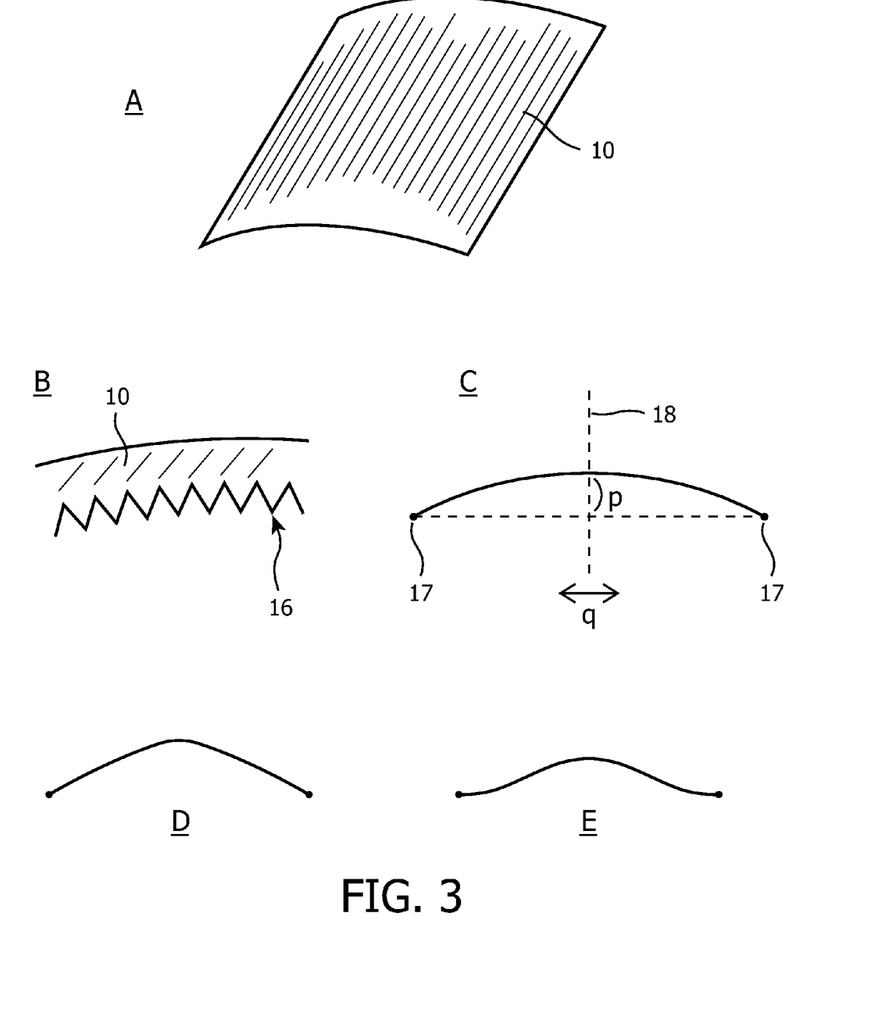
FIG. 3 shows in perspective a curved, prismatic sheet used in the luminaires according to the invention and some cross sections of this sheet.

In this embodiment, part of the curved sheet (10) is glued onto the surface of an open cylinder segment, of which two side parts (14) are shown. These parts are connected to the housing (2). The light of the LEDs (9) can be transmitted through the part of the sheet which is not attached to the cylinder segment. The cylinder has a radius of 10.0 cm. The cylinder affects the shape of the sheet. So, the cross section of the sheet (10) as shown in FIG. 1-D has the form of part of a circle. The curvature of the sheet (10)—as defined before—amounts to 0.19 (p=2.6 and q=13.5; compare FIG. 3-C). The prisms on the concave side of the sheet are again pointing away from the LEDs (9).

Between LEDs (9) and sheet (10), an additional, self-bearing layer (15) of phosphor material has been provided. This material converts at least part of the blue light emitted by the blue-emitting LEDs (9) into light of a different color. As a result of the presence of the blue-emitting LEDs (9) and the phosphor layer (15), optimization of the color rendering index (CRI) is possible, which is especially beneficial when the luminaire (1) is used for office lighting.

Figure 2:
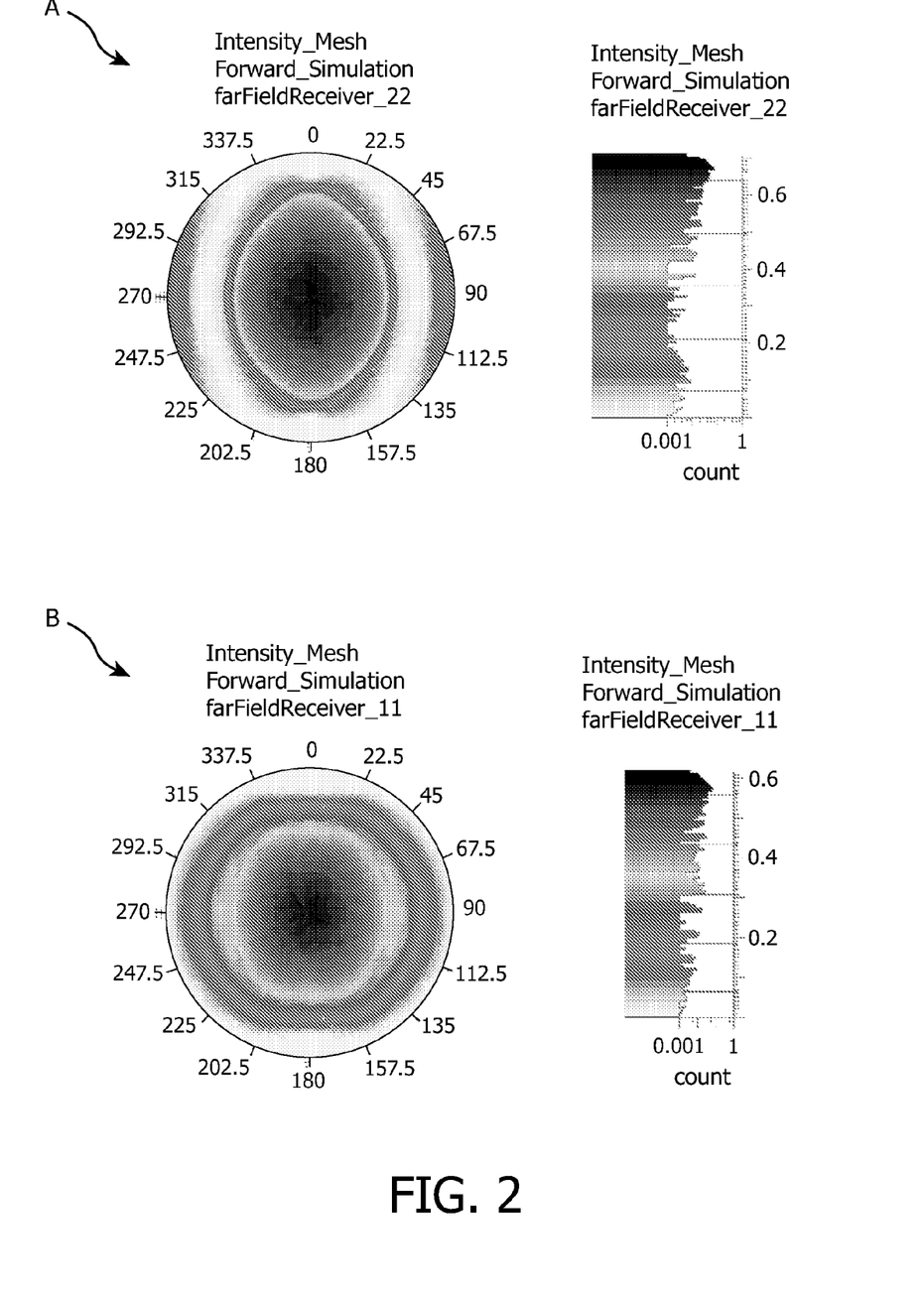
FIG. 2 shows the intensity patterns of two luminaires, one being according to the prior art (A) and the other being according to the invention (B)

FIG. 2 shows the intensity distribution of light emitted by the luminaires described in FIG. 1-B (not according to the invention) and FIG. 1-C (according to the invention). The light intensity distribution of the luminaire not according to the invention is shown in FIG. 2-A, whereas the same distribution shown in FIG. 2-B is achieved by the luminaire according to the invention. A comparison of both intensity profiles shows that the one in FIG. 2-A is rather asymmetric. Especially at glare angles above 60° (in the width direction of the luminaire) a high intensity is present, shown in FIG. 2-A as a difference between white and black. The profile in FIG. 2-B is far more symmetric. Moreover, the intensities shown in FIG. 2-A are not present in FIG. 2-B. This clearly demonstrates the effect of curving the prismatic sheet (10) on the light intensity profiles of luminaires as described above. Thus, with prismatic sheets being positioned in a curved manner in the housing of a luminaire, low-glare, symmetric beam shaping is possible.

In FIG. 3, the curved prismatic sheets are described in more detail. FIG. 3-A shows a perspective view of such a sheet (10). It has a plurality of elongated linear prism structures with right top angles on one of the main surfaces. The other surface of the sheet is unstructured. The structured surface is on the concave (hollow) side of the sheet. It is moreover curved in such a manner that the (imaginary) axis of curvature runs parallel to the elongated linear prism structures of the sheet. These linear structures are schematically indicated in the sheet by lines. As described before, such sheets can be obtained from firms like 3M and Reflexite. These sheets have on one of their main surfaces a plurality of elongated linear prism structures having a top angle of appr. 90° (=right top angle). The best results are achieved using sheets with top angles of exactly 90° (deviation less than 5°). The other main surface is flat (i.e. not structured). FIG. 3-B shows a small part of a cross section of such a sheet, with right top angles (16). In practice, the distance between the linear prism structures ranges between 20 and 100 micron.

With the help of FIG. 3-C, the definition of curvature is explained in more detail. The curvature of a sheet (10) is defined as the maximum distance (p) from the curved sheet (10) to an imaginary flat plane (dotted line) connecting two opposing ends (17) of the sheet, divided by the shortest distance (q) between these ends. Thus, in a sheet of 10 cm×10 cm having a maximum distance of 1 cm from the flat plane connecting two opposing ends of the sheet, the curvature amounts to 0.1. Considering the mirror plane (18) of both opposing ends of the sheet, the curve may be symmetric or asymmetric. Although asymmetric curvatures in the sheet (not shown) will also show the advantageous effect of glare reduction, such curvatures will negatively influence the beam shape of the light exiting the luminaire. So, sheets having the curve maximum centrally between two opposing edges (shown) are preferred. The (symmetric) curves can have different forms, like a parabolic curvature (FIG. 3-D) or a Gaussian curvature (FIG. 3-E). The latter curves can be induced by clamping the opposing ends (17) of a prismatic sheet (10) at a specific angle.

Figure 4:
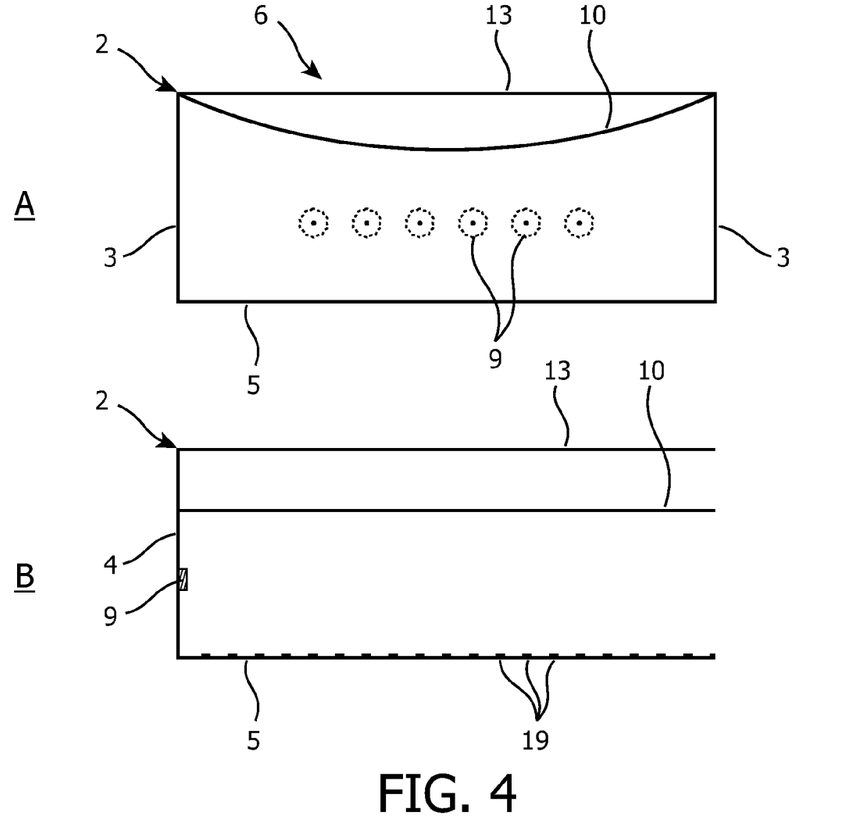
FIG. 4 shows a preferred embodiment of the luminaire according to the present invention.

FIG. 4 shows a preferred embodiment of the luminaire according to the present invention. FIG. 4-A shows a cross section of the luminaire transverse to its length direction, whereas FIG. 4-B shows a cross section along its length direction. This embodiment has the feature that the light source (7) comprises a number of LEDs (9) positioned in the housing (2) on at least one of the end wall parts (4), and that reflecting means (19) are positioned on the bottom wall part (5) of the housing for directing the light generated by the LEDs (9) via the curved sheet (10) to the exit window (6).

In this embodiment of the invention, the prismatic sheet (10) is used as part of a hollow light guide to create the required beam. Light generated by the LEDs (6) during operation of the luminaire is collimated and captured in the light guide. Said light guide consists of reflective (specular of prismatic) side wall parts (3) and bottom wall part (5) and the curved prismatic sheet (10). The light beams are extracted from the light guide when they impinge on the reflecting means (19). In the depicted luminaire, these means (19) are provided by printing a pattern of diffusely reflective outcoupling dots on bottom wall part (5). Also here, the luminaire can optionally be provided with a cover (13) formed by a transparent plate, for example of glass material.

Figure 5:
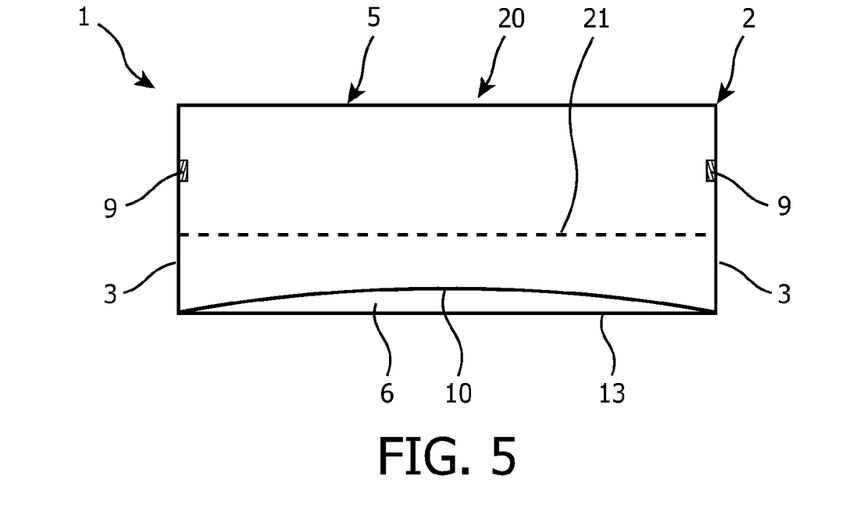
FIG. 5 shows another preferred embodiment of the luminaire according to the present invention.

FIG. 5 shows in cross section another preferred embodiment of the luminaire according to the present invention. In this embodiment, the housing (2) of the luminaire (1) comprises a second light exit window (20) in the bottom wall part (5). In this specific embodiment, the LEDs (9) are positioned on the side walls (3) of the housing. A diffuser plate (21) is positioned in the housing between the LEDs (9) and the curved prismatic sheet 10). Again this sheet is positioned in a self-bearing manner, with the top angles pointing to the outside of the housing (2). Also here the curved sheet (10) causes the desired glare reduction of the light generated by LEDs (9). Optionally a transparent cover (13) of glass material or in the form of a polycarbonate plate may be attached in the exit window (6) of the luminaire (2).

Said second light exit window (20) is preferably provided with an optical plate (21) for generating a desired second beam, being directed substantially in the opposite direction with respect to the beam exiting the exit window (6). Said optical plate (21) consists of a diffuser of a flat prismatic plate (with top angles pointing to the inside of the housing). Luminaires of this type should not be built into ceilings, but are intended for being positioned at some distance below ceilings. Light emitted via second light exit window (20) exits the luminaire in the direction of the ceiling (uplighter). By using the indicated optical plates (21) in the luminaire, batwing-type intensity profiles can be created on the ceiling. Light emitted via light exit window (6) exits the luminaire in the direction of the ground (downlighter).

Figure 6:
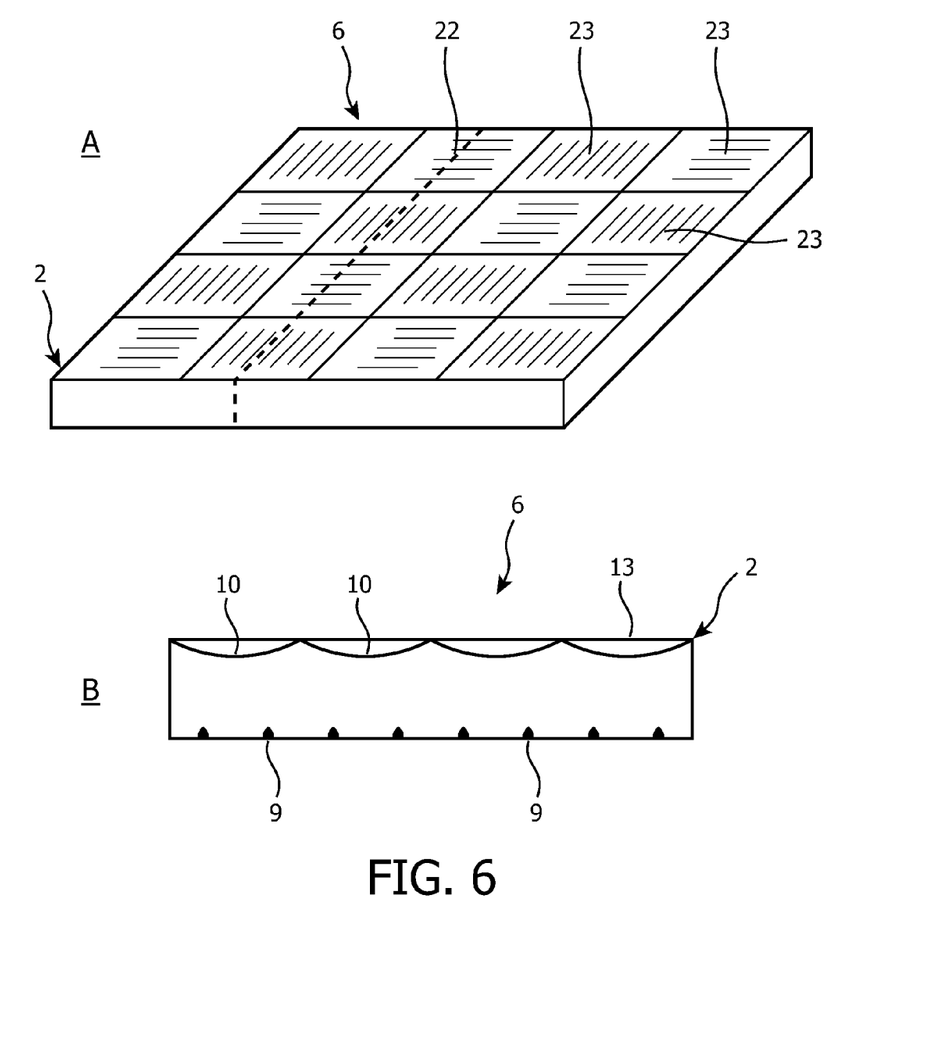
FIG. 6 shows still another preferred embodiment of the luminaire according to the present invention.

FIG. 6 shows still another preferred embodiment of the luminaire according to the present invention. This luminaire is characterized in that the exit window comprises a number of sub-windows containing a curved sheet. This feature will be applied especially in luminaires having both a large length and a large width. Applying a single curved sheet in luminaires of this dimension leads to too large a thickness of such a luminaire. FIG. 6-A shows a perspective view of such a preferred luminaire having a length of 60 cm, a width of 60 cm and a depth of 10 cm. FIG. 6-B shows a cross section of the luminaire in FIG. 6-A taken along the plane indicated by dotted line (22).

As shown in FIG. 6-A, the exit window (6) comprises 16 sub-windows (23) of appr. 15 cm×15 cm. Each of these windows contains a curved sheet (10), preferably having the top angles pointing to the outside of the housing (2). As sketched in FIG. 6-A, the sheets (10) are positioned in such a manner that the prismatic lines of neighboring sheets (10) are perpendicular to each other. This manner of positioning the sheets (10) has the benefit that additional glare reduction is obtained in the direction of the prisms in the sheet. The two-dimensional light source may also here consist of an array of LEDs, for example 8×8 LEDs (9). By the addition of a diffuser it may be achieved that the extended light source provides an improved constant flux during operation of the luminaire (2). This embodiment with sub-windows is particularly useful when asymmetrically curved prism foils are used. The asymmetry can then be cancelled by applying a sub-window with an asymmetric curve together with a sub-window with the mirror image of the asymmetric curve.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. Luminaire, comprising:
   a housing, having at least one side wall part and a bottom wall part,
   a light source and/or lamp accommodating means being positioned in the housing, and
   a curved, optically transparent sheet having a plurality of elongated linear prism structures with right top angles on its concave surface, said surface facing away from the light source, wherein the curved sheet is clamped in sheet clamps in a self-bearing manner in the luminaire, the mutual distance between the sheet clamps being changeable for enabling adjustment of the curved sheet.

2. Luminaire according to claim 1, wherein the curved sheet has a curvature of between 0.02 and 0.4, the curvature of the curved sheet being the ratio between a maximum distance (p) from the curved sheet to an imaginary flat plane connecting two opposing ends of the sheet and the distance (q) between these ends.

3. Luminaire according to claim 1, wherein a clamping direction of the sheet clamps is adjustable.

4. Luminaire according to claim 1, wherein part of the sheet is provided on the surface of at least one cylinder segment.

5. Luminaire according to claim 1, wherein the light source is a two-dimensional area generating light of a constant flux during operation.

6. Luminaire according to claim 5, wherein the light source comprises a number of blue-emitting LEDs and wherein the housing comprises a layer of phosphor material for converting at least part of the blue light emitted by the light source into light of a different color.

7. Luminaire according to claim 5, wherein the light source comprises a number of LEDs positioned in the housing on at least one of the end wall parts, and wherein reflecting means are positioned in the housing for directing the light generated by the LEDs via the sheet to the exit window.

8. Luminaire according to claim 5, wherein the housing comprises a second light exit window in the bottom wall part.

9. Luminaire according to claim 8, wherein the second window comprises an optically transparent sheet having a plurality of elongated linear prism structures with right top angles on one of its surfaces, said surface facing the light source.

10. Luminaire according to claim 8 wherein the exit window comprises a number of sub-windows containing a curved sheet.

\* \* \* \* \*